United States Patent [19]

De Weese

[11] 4,138,937

[45] Feb. 13, 1979

[54] CORN POPPER

[76] Inventor: Ralph M. De Weese, 270 Seventh St., (Apt. 2A), Wheeling, Ill. 60090

[21] Appl. No.: 771,761

[22] Filed: Feb. 24, 1977

[51] Int. Cl.² ............................................. A23L 1/18
[52] U.S. Cl. .................................. 99/323.5; 219/432; 219/442
[58] Field of Search .......................... 99/323.4–323.11; 219/432, 433, 436, 438, 442, 443

[56] References Cited

U.S. PATENT DOCUMENTS

| | | | |
|---|---|---|---|
| 1,501,168 | 7/1924 | Isenhour | 99/323.11 |
| 1,759,475 | 5/1930 | Walker | 99/323.11 |
| 2,241,754 | 5/1941 | Wilsey | 99/323.5 |
| 2,248,812 | 7/1941 | Cretors | 99/323.7 |
| 2,254,271 | 9/1941 | Cretors | 99/323.9 |
| 2,863,037 | 12/1958 | Johnstone | 219/436 |
| 2,923,803 | 2/1960 | Kueser | 219/436 |
| 3,005,399 | 10/1961 | Libson | 99/323.5 |
| 3,059,567 | 10/1962 | Lindemann | 99/323.11 |
| 3,120,169 | 2/1964 | Echols | 99/323.9 |
| 3,377,942 | 4/1968 | Carbon | 99/376 |
| 3,666,499 | 1/1966 | Isnor | 99/323.5 |
| 3,722,399 | 3/1973 | Cole | 99/323.8 |
| 3,847,067 | 11/1974 | Munsey | 99/323.8 |

*Primary Examiner*—Harvey C. Hornsby
*Assistant Examiner*—Timothy F. Simone
*Attorney, Agent, or Firm*—Wegner, Stellman, McCord, Wiles & wood

[57] ABSTRACT

A corn popper for popping of popcorn by the wet or cooking oil process having a cooking pot with a heating element and stirring means therein with a floating lid structure for the pot to permit buildup of popped corn prior to discharge thereof from the pot and a surrounding bin for collection of the popped corn and a sifter-server unit. The pot and bin are separable for access to the popped corn and with the pot being detachably mounted on a base having drive means for the stirring means in the pot and electrical connections for the heating element.

13 Claims, 5 Drawing Figures

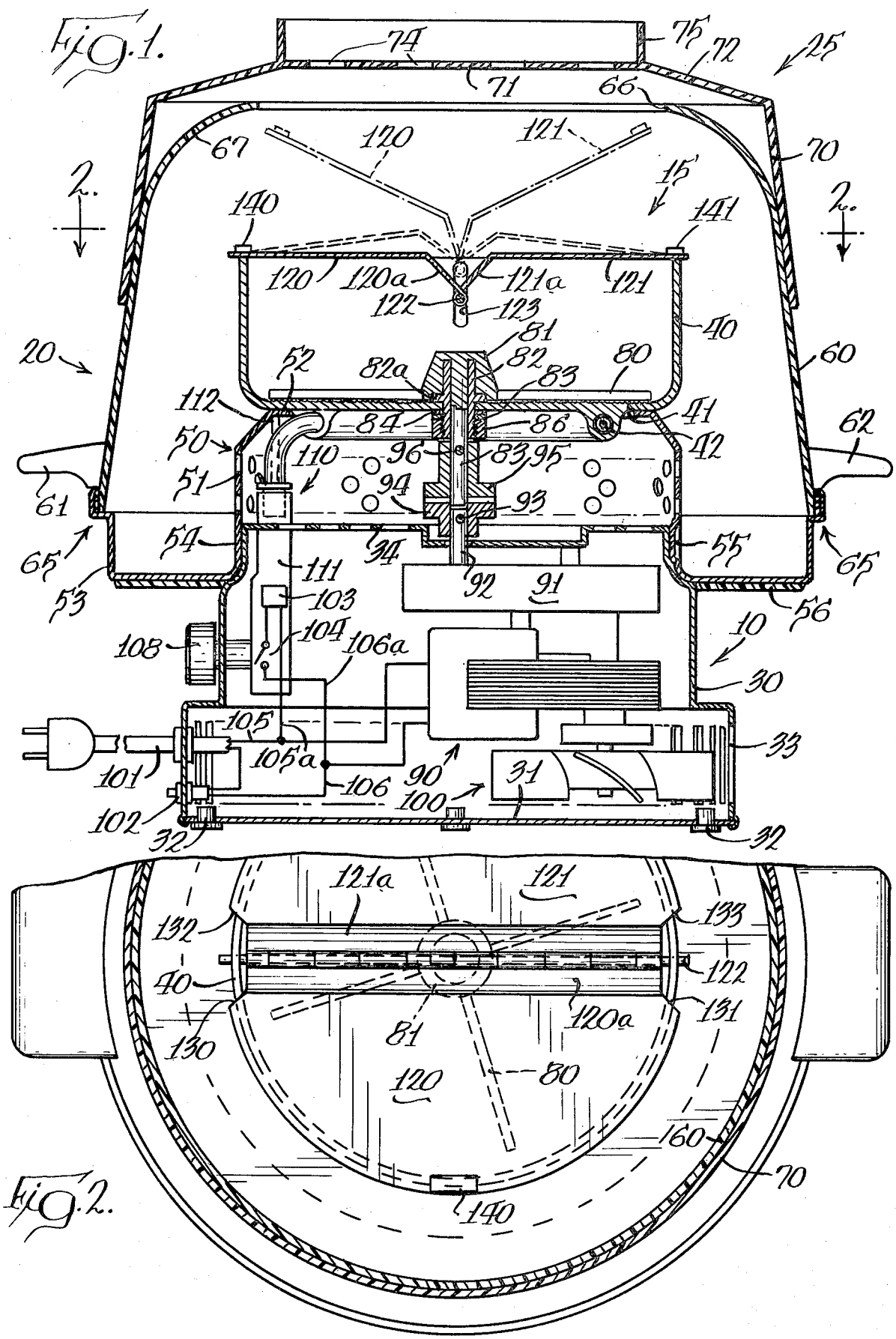

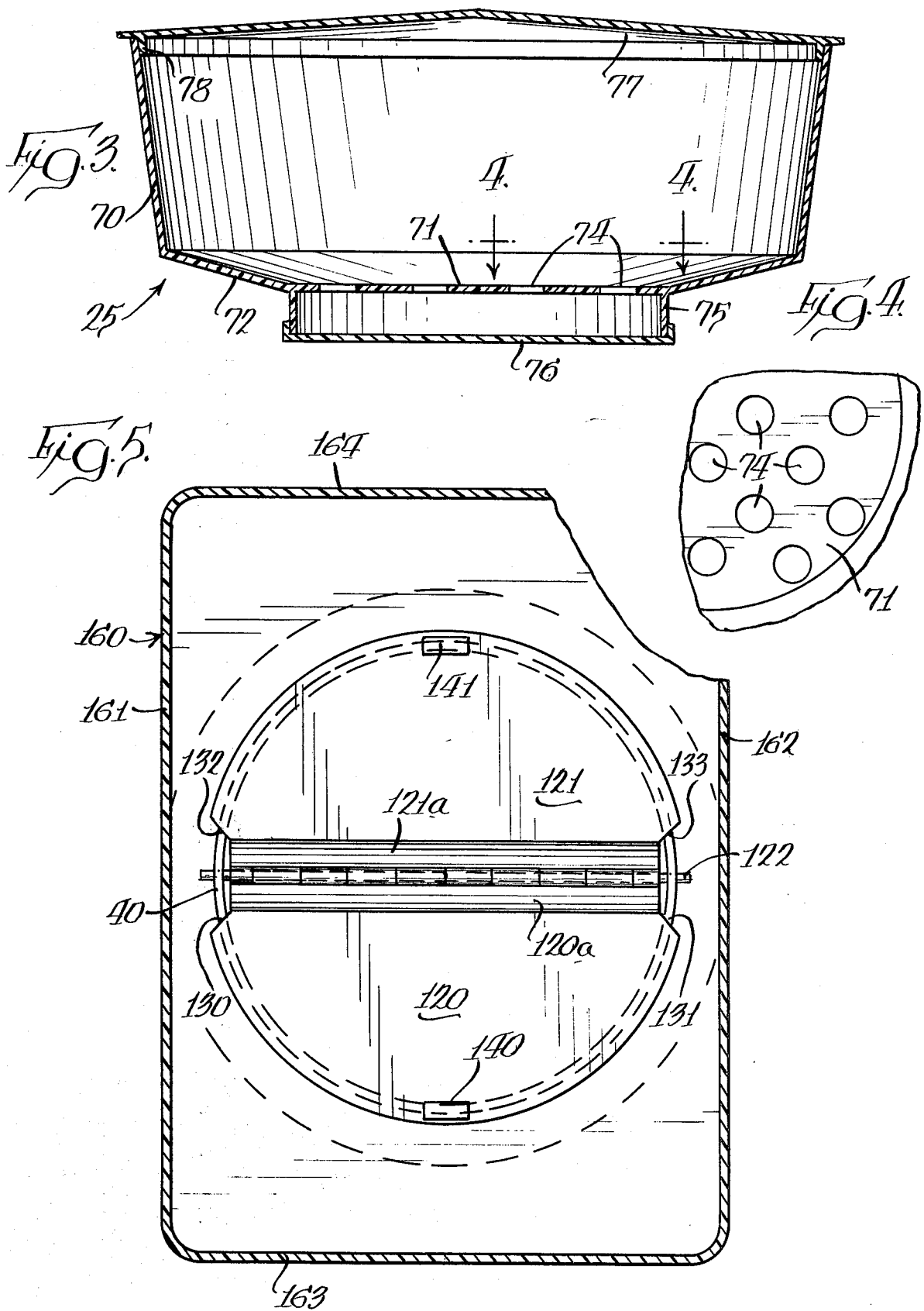

CORN POPPER

BACKGROUND OF THE INVENTION

This invention relates generally to an apparatus for the popping of popcorn by means of the wet or cooking oil process originally referred to as french fried popped corn with the apparatus providing the results heretofore known only with machines existing at the institutional or industrial level.

There are several types of corn poppers on the market which merely expose popcorn to a heated edible cooking oil and which do not do justice to the inherent capabilities of popcorn and are, therefore, inefficient. The existing units do not provide for the use of salt in the popping cycle because the salt will lie dormant and burn.

None of the existing corn poppers provide a home appliance for popping corn relying fully on the ideal commercial wet, or cooking oil process, along with salt to provide the best popped corn.

The existing units merely expose popcorn to a heated edible cooking oil and, frequently, call for the addition of butter which actually adds more oil to the popped corn and makes it considerably richer.

SUMMARY OF THE INVENTION

A primary feature of the invention is to provide an apparatus for popping of popcorn by means of the wet or cooking oil process enabling the use of cooking oil along with salt, with the unit being of a small size to enable home use.

An object of the invention is to provide a corn popper having a cooking pot with stirring means therein which may be heated for popping of the corn and with the pot having a floating lid structure to retain popped corn in the pot until the level of popped corn rises to lift the lid for release of moisture from the pot, followed by opening movement of the lid to permit popped corn to fly into a surrounding bin, whereby the pot may be relatively shallow to enable a small size unit and with the floating lid effectively increasing the size of the pot. The novel structure for carrying-out this object includes a two-section lid, each lid section having a gull wing configuration and loosely pivotally mounted to a pivot pin extending through vertically elongate slots in the wall of the pot whereby the lid sections which are suitably weighted around their perimeter may float upwardly while retaining substantial engagement with the top edge of the pot wall during initial stages of the corn popping operation, followed by pivoting of the lid sections away from the top edge of the pot wall as the popping operation progresses.

Another object of the invention is to provide a home-type appliance, suitable fo use as a corn popper, having a base with a separable cooking pot mounted thereon with stirring means in the cooking pot and a heating element secured thereto, with a drive motor in the base along with electrical connections and with a separable drive coupling for the stirring means and a separable electrical connection for the heating element whereby the cooking pot may be separated from the base for cleaning or other purposes.

Still another object of the invention is to provide a corn popper having a cooking pot with stirring means therein detachably mounted on a base, a heating element secured to the cooking pot for heating thereof, drive means mounted in the base for the stirring means and means surrounding the cooking pot for receiving the popped corn.

Another object of the invention is to provide a corn popper having a cooking pot with stirring means therein operable during the corn popping operation and with a sifter-server unit forming part of an enclosure surrounding the cooking pot to receive the popped corn during the corn popping operation and separable from the pot to provide for serving of the popped corn, the sifter-server unit having a botton with perforations of a size to retain fully popped corn but to permit corn kernels and partially-popped corn to pass therethrough whereby after separation of the cooking pot from the sifter-server unit, the unit may be shaken to shift inedible parts into a collection area and with a cover closing off the collection area and a second cover placeable on the top of the sifter-server unit to facilitate shaking of the popped corn and to provide for storage thereof.

Additional features of the invention include the use of a motor-driven fan for circulating air through the corn popper by means of air passages in the structural walls of the corn popper and out of the corn popper through top openings; the formation of a part of the corn-receiving bin as a sleeve with an open top and with an inwardly-curved upper wall section to receive corn flying out of the cooking pot and deflect the popped corn downwardly; the utilization of an electrical circuit for the heating element and the drive motor with switch means whereby the motor and fan may operate without energization of the heating element and with a thermostat control for the heating element; the extension of the pivot pin for the cooking pot lid beyond the slots in the cooking pot wall for manual engagement and depression thereof to pivot the lid sections upwardly to an open position; the positioning of the stirring means in the form of a plurality of radially-extending tangs in engagement with the inner surface of the cooking pot bottom and the roughening of the latter whereby salt utilized in the corn-popping process is milled; and the structural arrangement whereby the corn popper may be a round unit or generally rectangular in external configuration with two sides of the unit being closely adjacent to the ends of the lid pivot pin and the other two sides defining a longer dimension to provide greater volume for collection of popped corn as it flies out from under the lid sections which have pivoted to an open position.

BRIEF DESCRIPTION OF THE DRAWINGS

FIG. 1 is a central vertical section of the corn popper showing the lid structure in several different positions in broken line;

FIG. 2 is a partial section, taken generally along line 2—2 in FIG. 1 and rotated approximately one-quarter turn;

FIG. 3 is a central vertical section of the sifter-server unit;

FIG. 4 is a fragmentary section, taken generally along the line 4—4 in FIG. 3; and FIG. 5 is a section, taken generally along the same line as FIG. 2 and showing the shape of an alternate embodiment of the corn popper.

DESCRIPTION OF THE PREFERRED EMBODIMENTS

The corn popper, as shown in FIG. 1, has several primary components including a base, indicated generally at 10, a cooking section, indicated generally at 15, means defining an enclosure for the cooking pot, indicated generally at 20, and a sifter-server unit forming an optional part of the enclosure and indicated generally at 25.

In the embodiment of FIGS. 1-4, the base 10 has an upstanding annular wall 30 and a bottom panel 31 with supporting pads or feet 32. The wall 30 has air inlet openings 33 and, alternatively, these openings could be in the bottom panel 31, whereby air may enter the base and flow outwardly of the base through openings in a perforate top panel 34 of the base which is secured to the annular wall 30. The cooking section 15 includes a relatively shallow circular cooking pot 40 of metal having an inner bottom surface 41 which is slightly roughened and a heating element 42 imbedded in the underside of the cooking pot. The roughened surface retains some oil as the corn is popping and also assists in milling of salt used in the process. The heating element 42 may be secured to the underside of the cooking pot 40 in any other desired manner, so long as the cooking pot is heated when the heating element is energized. The cooking pot 40 is attached to an annular shroud, indicated generally at 50, and forming part of the enclosing means. The shroud has a perforate annular wall 51 depending downwardly from an inturned circular flange 52 secured to the underside of the cooking pot and a lower section 53 of a generally U-shaped cross section to have a part 54 thereof fit on the upper end of the base wall 30. Rotational alignment of the shroud to the base is obtained by interacting indented wall sections, indicated generally at 55. A ring 56 of heat insulating material is applied to the underside of the U-shaped section 53 of the shroud to permit finger engagement therewith, since this part of the shroud will be heated by heat conducted from the cooking pot 40.

The means 20 enclosing the cooking section 15 in addition to the shroud 50 includes additional structure defining a storage bin and, more particularly, a generally cylindrical sleeve 60 having a pair of suitably formed external handles 61 and 62 thereon and, at the lower end, having structure, indicated generally at 65, forming a snap fit connection between the lower end of the sleeve and an outer peripheral edge of the shroud 50. With the sleeve 60 being of a flexible plastic material, it is possible to flex the sleeve and release the snap connection 65 between the sleeve and the shroud. The sleeve 60 has a top opening 66 overlying the cooking section 15 with an upper part 67 of the sleeve 60 being curved inwardly toward the top opening 66 to deflect popped corn downwardly as it flies out of the cooking pot 40. The closure is completed by the optionally usable sifter-server unit 25 which is shown separately in FIG. 3 and has an outwardly-flared upstanding circular wall 70 with a bottom wall 71 having a peripheral inclined section 72 extending to the upstanding wall 70. The bottom wall 71 has openings 74 therein which are of a size to prevent fully-popped corn from passing therethrough but permitting passage of unpopped corn kernels and partially-popped kernels. The unpopped kernels and partially-popped kernels can pass through the openings 74 into a collection area, defined by a cylindrical wall 75 depending from the bottom wall 71 and closed-off by a cap or cover 76 fitted thereon and which may be removed for cleaning of the collection area. The sifter-server unit 25 is completed by a cover 77 which has a depending flange 78 fittable within the upstanding wall 70, with the cover not being used during the corn popping operation but subsequently being used to enable a strong shaking of the sifter-server unit to sift material into the collection area of the unit, to optionally distribute powdered or liquid flavoring on the popcorn and to also adapt the unit for storage of the popped corn.

In use of the sifter-server unit during the popping process, it will be noted that the unit is inverted with the upstanding wall 70 fitted onto the sleeve 60 and with the cover 76 omitted whereby air and moisture may flow through the openings 74.

The cooking pot 40 has stirring means mounted therein including a series of tangs 80 which extend radially outward from a cap 81 having an annular recess to receive an upper end of a tubular bearing 82 and with a central post 83 of the cap extending downwardly through the bearing. The bearing 82 acts as a standpipe as well as a guide and bearing for the cap 81, whereby leakage of liquid from the cooking pot 40 is prevented. The bearing 82 is sealed to the pot by a heat resistant disc 84 and held in position by a flange 82a on the bearing and washer 85 and a locking nut 86 threaded to the exterior of the bearing 82 below the pot.

The stirring means within the pot are rotated by drive means including a motor, indicated generally at 90 mounted in the base 10, having an output shaft which is connected to a gear reducer unit 91 having an output shaft 92 drivingly connected, as by a pin 93, to one element of a separable drive coupling, with another element 95 of the drive coupling being pinned to the central post 83 extending downwardly from the cap 81 by a pin 96. The output shaft 92 is beneath the top level of the drive coupling element 94 whereby the pin 83 may fit down into the drive coupling element 94, with this assisting in locating of the structure which is separable from the base 10. The output shaft of the motor 90 also drives a fan, indicated generally at 100, which draws air into the base through the openings 33 and directs air upwardly through the perforate top panel 34 and through the openings in the perforate shroud wall 51 whereby the circulating air may flow up through popcorn within the enclosure and out of the openings 74 to remove moisture from the bin containing the popped corn.

An electrical circuit for the corn popper includes a supply cord 101 extending into the base, a main on-off switch 102, a thermostat 103, and a second on-off switch 104. The main on-off switch 102 is connected across the lines 105 and 106 extending to the drive motor 90 whereby whenever the switch is closed the motor and fan operate to have the air circulate through the unit and the stirring means rotating. Branch lines 105a and 106a extend from line 105 and line 106, respectively, to connect the thermostat 103 and the switch 104 whereby heat is selectively applied to the cooking pot dependent upon the closure of the switch 104 by a knob 108 and the control of the thermostat 103. Power is delivered to the heating element 42 through a quick-disconnect electrical coupling, indicated generally at 110, and with such unit being well known in the art and with a part 111 of the quick-disconnect coupling being attached to the base 10 having a thermostatic probe 112 extending upwardly therefrom to engage the underside of the cooking pot 40 for detecting the temperature thereof.

The cooking pot 40 has floating lid structure associated therewith, including a pair of gull wing lid sections 120 and 121, each having a major part of its perimeter resting upon the top edge of the wall of the cooking pot 40. Each of the wing sections 120 and 121 of the lid has a downwardly-angled central part 120a and 121a, with a curved end to loosely receive a removable pivot pin 122 extending therethrough to hinge the wing sections together and with the ends of the pivot pin extending through and beyond a pair of opposed vertically elongate slots 123 formed in the wall of the pot. Additionally, each of the wing sections has a recessed periphery adjacent the downwardly-angled part, as indicated at 130-133, to set the downwardly-angled parts 120a and 121a within the perimeter of the pot wall and to also provide fulcrum points for upward pivoting of the lid wing sections in manual opening of the pot. Each of the wing sections 120 and 121 is also weighted at a location to assist in holding the perimeter of the wing sections against the top edge of the pot wall during an initial part of the corn popping operation and, as shown, this weighting is accomplished by a pair of weights 140 and 141. The wing sections normally close the cooking pot in the full line positions shown in FIG. 1, with the hinge pin 122 being positioned approximately mid-way between the top and bottom of the opposed elongated slots 123. In the early stages of popping a batch of popcorn, the popped corn will increase in volume to initially lift the lid to an intermediate position, shown in broken line, with a major part of the perimeters of the lid wing sections still substantially engaging the top of the pot wall to increase the effective volume of the cooking pot while still maintaining the pot closed to prevent unpopped corn kernels flying out of the pot. As the volume of popped corn further increases, the wing sections 120 and 121 may move to fully open position, with the hinge pin 122 at the upper end of the slots 123 to permit discharge of popped corn into the bin surrounding the cooking pot 40. With the lid shown in full line normally closed position, it is possible to place the seasoned popcorn cooking oil and the corn kernels within the pot by manually depressing the hinge pin 122 toward the bottom of the elongate slots 123, with the fulcrum points 130-133 causing upward pivoting of the wing sections for access to the interior of the cooking pot.

In a corn popping operation, the unit is plugged-in by attachment of the cord 101 to an electrical socket and the switch 102 turned to the on position. This energizes the drive motor to operate the stirring means within the pot and will normally also start the heating element 42, since the cooking pot is cool and the knob 108 has been appropriately positioned to close the switch 104. After a short interval of heating time, the enclosure is opened by removal of the sifter-server unit for access to the cooking pot and a measured amount of popcorn oil, seasoning, and salt are placed within the cooking pot by raising of the lid wing sections 120 and 121 by depression of the hinge pin 122 or by merely lifting one of the lid wing sections. Because of the angled parts 120a and 121a, a lid wing section can pivot beyond the vertical. The lid is then returned to closed position and the popping cycle commences, with the corn popper being designed to have the corn start popping in approximately 1¼ minutes, with the popping completed in approximately 3 minutes to provide the highest quality popped corn. During popping, the sifter-server unit 25 may be left off the unit and with the inwardly-curved section 67 of the sleeve 60 having the popped corn directed thereagainst as the lids are in fully opened position (as shown in broken line in FIG. 1) and the corn being deflected downwardly toward the shroud 53. Alternatively, the sifter-server unit may be positioned, as shown in FIG. 1, and with the cover 76 removed.

During popping, the pot fills with popped corn and, as previously described, the initial action of the lid is to move to the intermediate broken line position wherein the pot is still effectively closed, but the volume thereof increases. This enables the use of a relatively shallow pot and still retains the popping action within the cooking pot and prevents many unpopped corn kernels from flying out of the pot. With the floating lid, it is possible to ultimately obtain a volume of popped corn which will prevent unpopped kernels from flying out of the pot and, thereafter, the volume of the popped corn raises the lid sections to the fully raised positions shown in FIG. 1 by overcoming the weight of the weights 140 and 141, as well as the weight of the lid wing sections themselves. The size of the cooking pot and the weighting of the lid wing sections are related to enable popcorn to leave the cooking pot without parching. During the remainder of the popping cycle, the popped corn falls into the bin surrounding the cooking pot 40. During the popping cycle, the fan 100 has moved air through the bin to remove moisture from the popped corn and also to cool the motor 90. After completion of the popping cycle, the switch 104 can be opened to turn off the heat to the cooking pot. However, the stirring means continues to run. After opening of the switch 102, to discontinue operation of the drive motor, the bin is removed from the base by engagement of the handles 61 and 62 and the heat insulating ring 56 to lift the bin and cooking pot off of the base. This separates the separable drive coupling and the quick-disconnect electrical coupling. The bin structure is then inverted and with the cap 76 placed on the sifter-server unit 25 the popped corn falls into the sifter-server unit, with the sleeve 60 being lifted therefrom. The cover 77 then may be placed on the upstanding wall 70 of the sifter-server unit, and the popped corn thoroughly shaken to cause unpopped kernels and partially-popped corn to fall into the collection area through the openings 74. The sleeve 60 and shroud 53 may then be returned to the base 10 by again reengaging the separable drive coupling having the coupling elements 94 and 95 and reconnecting the quick-disconnect electrical coupling 110. This reassembly in accurate alignment is facilitated by the detent means 55 between the base wall 30 and the shroud 53 and the fitting of the pin 83 within a recess of the coupling element 94.

An alternate embodiment is shown in FIG. 5 with the alternate structure differing only in the shape of the base and the bin enclosing the cooking pot 40. In the embodiment of FIGS. 1–4, the base and enclosing sleeve 60 are generally cylindrical, while in the embodiment of FIG. 5, the corn popper is generally rectangular. The enclosing sleeve 160 is shown to illustrate the shape and is of a generally rectangular cross section, with a pair of opposed walls 161 and 162 extending closely adjacent the ends of the hinge pin 122 and with a pair of walls 163 and 164 being spaced apart a greater distance to form an increased storage volume in the parts of the bin which receive the popped corn as the lid wing sections 120 and 121 open. The shape of the embodiment shown in FIG. 5 enables the popping of the same volume of corn, with the first dimension between the walls 161 and 162 being minimal because of very little popcorn exiting the pot adjacent the pivot pin 122 and the second longer dimension between the walls 163 and 164 providing the space for collection of the popcorn. From the shape of the sleeve 160, the shape of the base and a coacting sifter-server unit will be apparent.

The structure of the cooking pot 40 and the floating lid used in both embodiments provides a compact design, with the lid wing sections 120 and 121 allowing good distribution of the popped corn into a bin and an increase in volume within the pot prior to opening for discharge of popped corn.

The hinge pin 122 can be removed from the lid sections 120 and 121 for separation of these parts from the cooking pot for ease of cleaning.

With the structures disclosed herein a portable corn popper has been provided which is easily storable and transportable and which utilizes the process of wet popping, or french frying, popcorn to achieve the best possible popped corn.

The apparatus disclosed herein enables corn to pop in oil at approximately 390° at which temperature a phenominal effect takes place whereby the popped corn absorbs a unique taste or odor from the oil not experienced at lower temperatures and destroyed at higher temperature and the action occurs within a predetermined time period.

I claim:

1. A corn popper having a base, an open top pot supported on said base for popping the corn, stirring means within said pot, drive means for said stirring means including a motor in said base, a flexible lid for the pot to cause popped corn to exit the pot at the perimeter thereof, an annular shroud surrounding said cooking pot and at a lower level, said shroud having a downwardly extending wall with perforations and a surrounding chamber of generally U-shaped cross section for collection of popped corn which leaves the open top pot, air passages in said base connecting external air to the perforations in said wall for flow of external air through the collected popped corn, a circulating air fan in said base driven by said motor for inducing said air flow, and an open top storage bin removably attached to said shroud and partially overlying the pot perimeter for guiding popped corn exiting the pot to said chamber while permitting moisture-laden air to leave the corn popper.

2. A corn popper having a relatively shallow open top pot, stirring means within said pot and overlying the bottom of said pot to contact corn kernels resting on said bottom, a bin surrounding said pot to collect popped corn, a flexible lid covering said pot and having a perimeter resting on the top edge thereof, and means mounting a central part of said lid for upward movement to permit elevation of said central part away from a top edge of the pot as the popped corn volume increases to permit release of air from the pot while a major part of the lid perimeter rests on the top edge of the pot.

3. A corn popper as defined in claim 2 wherein said flexible lid includes two wing sections pivotally connected together by a pivot pin, and a pair of elongate slots in a wall of the pot each receiving an end of the pivot pin whereby the pivot pin may move upwardly as the popped corn volume increases.

4. A corn popper as defined in claim 3 wherein each of said wing sections has a part thereof in contact with the top edge of the pot provided with weight-adding means to maintain said contact as the central part of the lid rises.

5. A corn popper as defined in claim 4 wherein each of said wing sections has a downwardly-angled part and a recessed periphery adjacent thereto to have said parts loosely receive the pivot pin and permit the pivot pin to normally be positioned in said elongate slots beneath the level of the top of the pot.

6. A corn popper as defined in claim 5 wherein said normal position of the pivot pin is above the lower end of said elongate slots, the pivot pin has its ends extending beyond the pot for manual depression thereof to cause upward pivoting of the wing sections.

7. A corn popper as defined in claim 6 wherein the pivot pin is removable from the wing sections to separate the last-mentioned parts from the pot for cleaning.

8. A corn popper as defined in claim 4 including a bin surrounding said pot for collecting popped corn after the popped corn rises in the pot to pivot said wing sections about said pivot pin to permit outward movement of popped corn into the bin.

9. A corn popper as defined in claim 8 wherein said bin and pot are round.

10. A corn popper as defined in claim 8 wherein said pot is round and said bin is generally rectangular and having a first dimension axially of the pivot pin and a second longer dimension normal to the first dimension to receive the popped corn.

11. A corn popper as defined in claim 8 including power-operated stirring means in said pot.

12. A corn popper as defined in claim 8 wherein said bin has a top opening and part thereof surrounding the top opening curved to downwardly deflect popped corn as it flies out of the pot.

13. A corn popper as defined in claim 8 including stirring means in said pot, a heating element secured to the pot, a base removably supporting said pot, drive means for said stirring means including a drive motor in said base and a separable drive connection, and a quick disconnect electrical coupling between said heating element and said base whereby said pot may be separated from said base.

* * * * *